Jan. 28, 1930.  F. C. FANTZ  1,745,156
MACHINE FOR DEVELOPING OR GENERATING INTERSECTIONS OF CYLINDERS
Filed Dec. 2, 1927  2 Sheets-Sheet 1
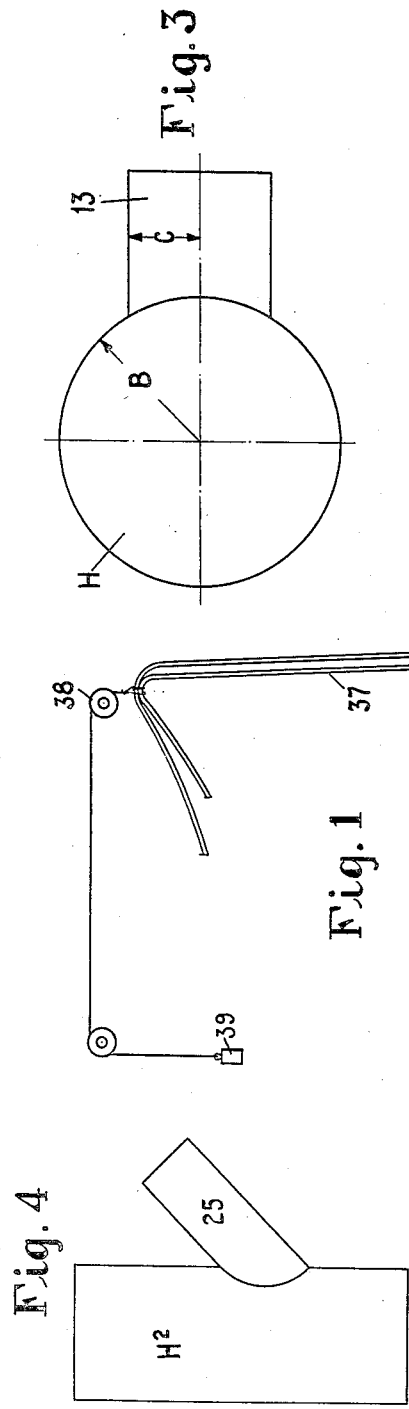
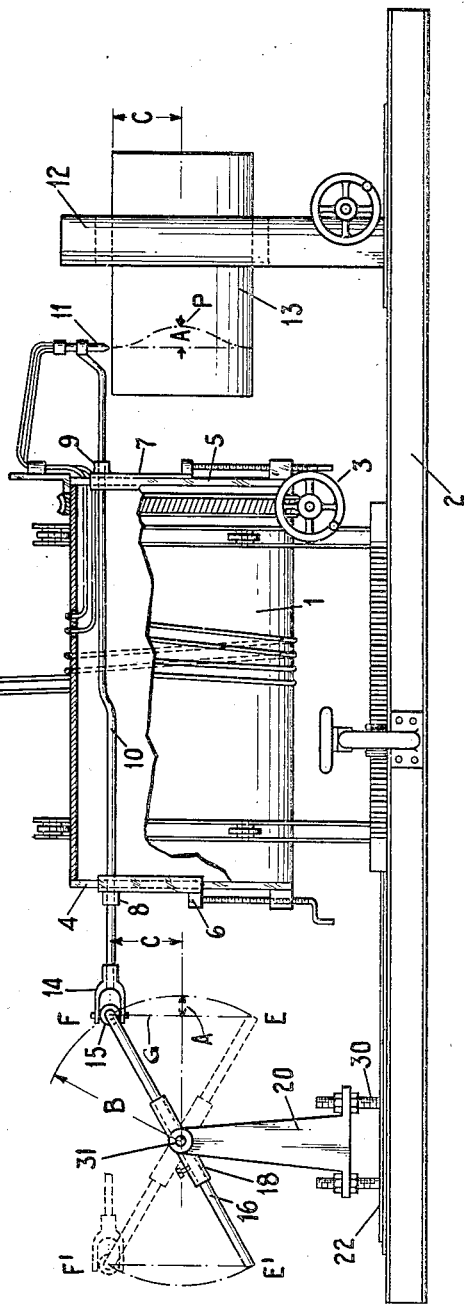
Inventor
Fred C. Fantz
By Attorneys Dodson & Roe Jan. 28, 1930.  F. C. FANTZ  1,745,156
MACHINE FOR DEVELOPING OR GENERATING INTERSECTIONS OF CYLINDERS
Filed Dec. 2, 1927  2 Sheets-Sheet 2
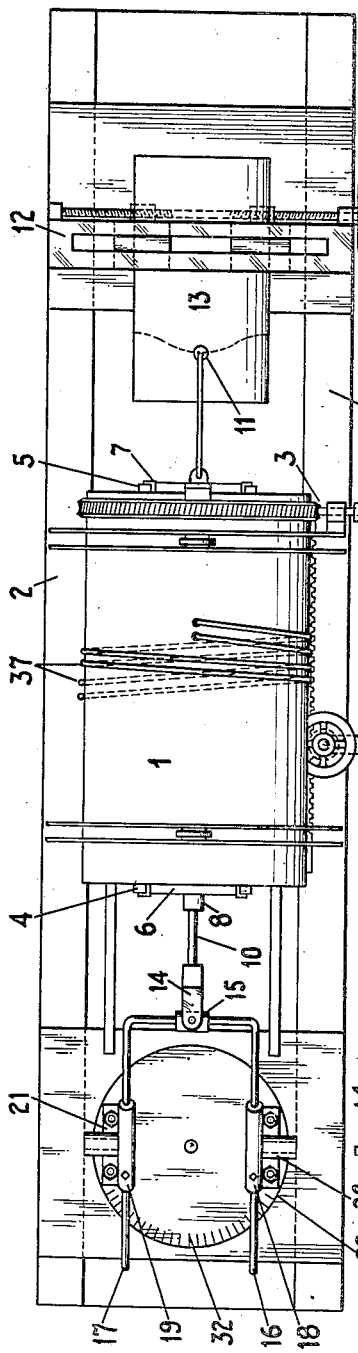
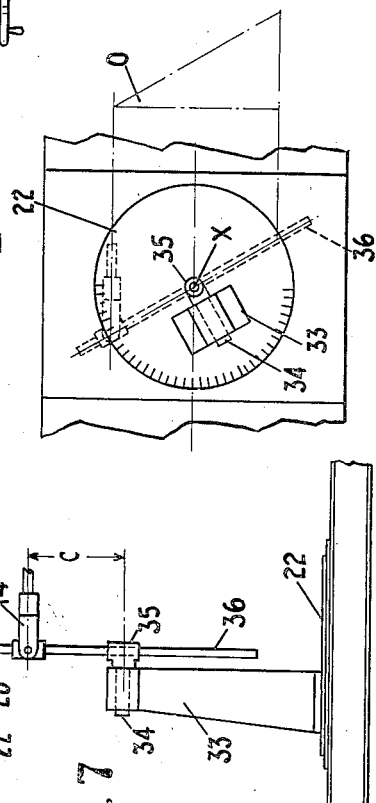
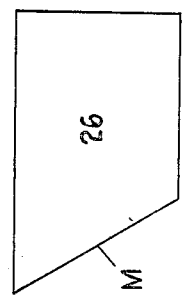
Inventor
Fred C. Fantz
By Attorneys Dodson & Roe Patented Jan. 28, 1930

1,745,156

UNITED STATES PATENT OFFICE

FRED C. FANTZ, OF WEBSTER GROVES, MISSOURI, ASSIGNOR, BY MESNE ASSIGNMENTS, TO MIDWEST PIPING & SUPPLY COMPANY, INCORPORATED, OF ST. LOUIS, MISSOURI, A CORPORATION OF MISSOURI

MACHINE FOR DEVELOPING OR GENERATING INTERSECTIONS OF CYLINDERS

Application filed December 2, 1927. Serial No. 237,149.

My invention has for its principal object, to develop any size and shape of any intersection of one cylinder with another without the development of any other fixed means, such as cams, templates, etc., or any separate set-up; and has for its further object, to develop the intersection of any cylinder with another, regardless of relative sizes.

Another object is, to cut any intersection, up to the diameter of the one being cut, at any tangent, at any angularity, on a bevel, straight if needed, or with mitered ends.

A further object is, to save time in the welding operation, by providing for rapid travel of the cutting torch, thus giving smoothness of cut; and also to provide the adjustment of the cutting torch, so that any desired angularity or bevel of the wall of the header or nozzle may be obtained.

Another object is, to provide means for uniform rapid travel of the cutting torch, thereby effecting a very substantial saving in the gas required for this operation, as well as in the time necessary to make the cut.

A further object is, to provide a machine which will cut the end of either a nozzle or a pipe, as well as the opening in the header.

Another object is, to provide means for adjusting the cutting torch, so that its flame will cut the metal in any preferred or desired shape.

It is a recognized fact, in the industry to which this invention appertains, that considerable time is required to cut the ends of the pipes or nozzles, and to cut the openings therefor in the header or pipe which is to be intersected. Numerous machines have been invented, such as those employing a cam which will guide the torch in its cutting operation, so as to generate the desired curve; but machines of this character, from their very nature, necessarily require a large number of cams or templates, which are quite expensive to make; and while, if a plant were engaged in turning out a single size of pipe and intersecting pipe, such a machine might be practical, it is regarded as thoroughly impractical by the industry, because of the fact that the sizes vary constantly and continually, which requires so many various sizes of templates or cams, and results in such an increase in cost, as to make the use of the machine, for practical purposes, prohibitive.

The result is, that in most shops it is customary to have a man lay out the curve on the drafting board, then transfer it, by a center punched line, to the article to be cut, so the operator can follow the center punched line with his torch and generate the desired curve for the intersection.

With the use of my invention, however, it becomes possible to generate or develop the intersection of any cylinder with another, regardless of the relative size of the two pipes, limited, of course, to the point where the intersecting pipe equals in diameter the one being intersected, as, obviously, if the intersecting pipe were to exceed in diameter the pipe being intersected, it would be impossible to join them together.

My means of accomplishing the foregoing objects may be more readily understood by having reference to the accompanying drawings, which are hereunto annexed and made a part of this specification, in which—

Fig. 1 is a side elevation of my improved device, showing the U-shaped member in both positions, i. e. for cutting the nozzles or pipes, and for cutting the header;

Fig. 2 is a top or plan view of the same;

Fig. 3 is a diagrammatic view, showing a header and a nozzle intersecting, and disclosing the radius B and the radius C;

Fig. 4 shows the header $H^2$ with the pipe or nozzle 25 intersecting at an angle;

Fig. 5 is a diagrammatic view of the header $H^1$ and the tangential intersecting pipe or nozzle 23, this figure showing the outline for the cam referred to in describing the manner usually employed for laying out pipe intersections;

Fig. 6 is a diagrammatic view of a pipe to be cut on a miter;

Fig. 7 is a side elevation of the construction employed where a pipe is to be cut on a miter; and Fig. 8 is a top or plan view of the same.

Similar reference numerals refer to similar parts throughout the entire description.

In order to accomplish the objects of my invention, I provide a cylinder or drum 1, preferably mounted upon a track 2 so that it can be moved longitudinally into any desired position. Suitable means 3 are provided for rotating this drum 1 about its axis. On the ends of the drum 1 are rigidly secured parallel slides, or guides, 4 and 5, upon which are mounted adjustable carriages 6 and 7, which carry bearings 8 and 9, in which is slidably mounted a rod or torch arm 10, the forward end of which carries a cutting torch 11, marking medium, or other means of parting material. In using the term "forward end" in reference to the drum 1, it should always be understood that I refer to the end adjacent the work.

A chucking device 12, preferably self-centering, is provided to hold the pipe or nozzle 13, the end of which is to be cut to intersect a header H. The carriages 6 and 7 are set out from the axis of the drum 1, the same distance as the length of the radius of the pipe or nozzle 13 which is to be cut. This radius is referred to as radius C. If the drum 1 is rotated on its axis, it is obvious that the torch 11 will be carried around the pipe or nozzle 13, and a perfectly straight cut will be made. It is, however, necessary to generate a suitable curve for the pipe intersection, and I accomplish this by providing a universal joint 14 at the rear end of the rod or torch arm 10, which is carried by the cross-piece 15 of a U-shaped member, the parallel arms 16 and 17 of which are adjustably mounted in bearings 18 and 19, which are pivoted in standards 20 and 21 extending upwardly from a suitable base 22.

Obviously, as the U-shaped member is oscillated upon the pivots 18 and 19, its cross-piece 15 will swing through an arc E—F corresponding to the distance of the cross-piece 15 from the pivots 18 and 19, this distance constituting the radius B of the arc of the circle which would be described if it were continued throughout a complete circle. Inasmuch as the rear end of the rod or torch arm 10 is secured to the cross-piece 15 by the universal joint 14, the oscillation of the cross-piece 15 upon the pivots 18 and 19 causes a reciprocating motion to be imparted to the rod or torch arm 10, and the length of this reciprocating motion will be equal to the ordinate A of the arc E—F, from its chord G struck across from the two extremes of oscillation, E and F, of the U-shaped member.

If we take the radius B as being the radius of the header H which is to be intersected, and set the U-shaped member so that the radius of the arc E—F which it describes, in being oscillated from one extreme to the other, equals the radius B, it is apparent that a curve will be generated corresponding to the periphery of the header H which is to be intersected; then if the carriages 6 and 7 on the drum 1 are set out from its axis a distance equalling the radius C of the nozzle or pipe 13 which is to intersect the header H, it will be apparent that the torch 11 carried by the drum 1 will, during its rotation, generate the exact curve required for the nozzle or pipe 13 which is to intersect the header H.

It will be seen that when the drum 1 is rotated, a pressure will be exerted upon the universal joint 14, and thereby transmitted to the cross-piece 15 of the U-shaped member, serving to depress it and move it through the arc E—F of the circle having the radius B, and this movement will operate to impart a forward motion to the rod or torch arm 10, until it reaches the plane P of the axis of the drum 1, when it will impart a rearward motion to the said rod or torch arm 10 until it reaches the extreme E of oscillation of the cross-piece 15 of the U-shaped member, which will be when the rod or torch arm 10 has been revolved through 180 degrees. As the drum 1 continues to rotate, it will exert a lifting movement upon the cross-piece 15 of the U-shaped member, and during 90 degrees of this rotation the rod or torch arm 10 will be given a forward motion, until the cross-piece 15 of the U-shaped member reaches the plane P of the axis of the drum 1, when an opposite movement will be imparted to the rod or torch arm 10, with the result that when the drum 1 has completed a revolution the end of the nozzle or pipe 13 will have been cut with the curve generated in exact accordance with that required for the pipe intersection.

It will be perfectly apparent that any size of pipe can be handled in this manner, merely by changing the radius B and the radius C, the only limit being the diameter of the drum 1. It may be found desirable in practice, instead of having one very large drum, to have two drums of different sizes, one for pipes up to 20 inches, and one for larger pipes, up to the largest diameter employed.

It will be obvious, from the foregoing description, that the construction as outlined will generate curves for pipe intersections of any size, controlled solely, as hereinbefore pointed out, by the diameter of the drum; but it will be equally apparent that when the intersecting pipes are of equal diameter, then with the radius B equal to the radius C, the U-shaped member will be in such a position that the drum cannot rotate, it being at a point which may be termed on "dead center." It is obvious, in view of this fact, that the radius B must always be greater than the radius C, if the machine is to be operative. When this "dead center" position occurs, by increasing radius B sufficiently to throw the U-shaped member off "dead center" and then generating the curve, it will be found upon measurement that the difference in the curve will be in thousandths of an inch, and since thousandths of an inch are never measured in pipe work, it follows that from a practical standpoint this is no objection to the use of the device for the generation of curves for intersecting pipes of equal diameter.

If a nozzle 23 is to be fitted tangentially to the header H¹, all the change necessary to be made in the apparatus will be to elevate the standards 20 and 21, as at 30, so that the pivotal points 31 of the U-shaped member will be offset a distance corresponding to the distance the intersection is off center.

When the intersection is at an angle to the header H²—not a right angle—I provide for generating the correct curve, by mounting the standards 20 and 21 on a rotatable base 22, and I mark or scribe a plurality of degrees 32 on the periphery of the base 22, to indicate the angularity to which it is turned. It follows that by turning the base 22 to the angle required for the intersection, the curve corresponding thereto will be generated on the pipe or nozzle 25.

Up to the present point, the construction has been confined to generating curves for the intersecting nozzles or pipes. When it becomes necessary to generate in the header H the curve E¹—F¹ for its intersection, it will be apparent that since this has to be cut on a convex surface, the high spot of the curve will occur at the low spot on the generated curve as heretofore described, hence it will be necessary to reverse the motion of the cutting torch 11.

This is accomplished by turning the U-shaped member so that its cross-piece 15 will be located in a position exactly opposite to that occupied when generating the curve on the pipe or nozzle 13. In this changed position it will describe an arc intermediate its extremes of motion, which is diametrically opposite to the arc it described in generating the curve E—F, and obviously the torch arm 10 will be moved rearwardly at the time when it would be moved forwardly in the operation previously employed.

It will be apparent that by rotating the base 22 to a required angle, where the intersection of the header H² by the nozzle 25 is at an angle, the correct curve will be generated in the header H², and that by elevating the standards 20 and 21 the required distance, the correct curve will be generated for the tangential intersection of the header H¹ by the nozzle 23.

The radius B for the header is secured in precisely the same manner as that heretofore described, and the radius C is also secured in exactly the same way, and obviously the length of the ordinate A will be the same in each case.

When it is desired to cut a miter M on the end of pipe 26, which is to be connected by a similar miter to another pipe (not shown), I employ a slightly different arrangement at the rear of the machine. Instead of the two standards 20 and 21, a single standard 33 is fixedly mounted upon the rotatable base 22. In the top of this standard 33, an axle 34 is rotatably mounted, the front end 35 of which is located in line with the center X of the base 22, at a point coincident with the axis of the drum 1. This axle 34 carries a rod 36, which is the same size as the cross-piece 15 of the U-shaped member, and therefore is adapted to have secured to it, as the desired radius of the pipe 26, the universal joint 14 carried by the rear end of the rod or torch arm 10.

Obviously, if the drum 1 is rotated, when the axle 34 is in line with the axle of the drum 1 (as shown in Fig. 7), it will carry with it this rod 36, and no reciprocating motion will be imparted to the torch arm 10; whereas, if the base 22 is rotated (as shown in Fig. 8) so that the axle 34 stands at an angle to the axis of the drum 1, the rod or torch arm 10, being attached to the rod 36 by the universal joint 14, will then be reciprocated in a plane (instead of in an arc, as where the cross-piece 15 of the U-shaped member guided the torch 11), and the cut will be made at the angle O at which the axle 34 intersects the axis of the drum 1. Since this angle O can be made of any desired degree, it follows that a miter M of any degree can be cut for pipes which are to be connected in this manner.

I have found it very desirable in practice, where an oxyacetylene flame is employed for cutting, to mount the hose 37, which conveys the gas to the cutting torch 11, by carrying it over a sheave 38 and providing a counterweight 39, then wrapping the hose 37 with a couple of turns around the drum 1. When the drum 1 rotates in one direction the hose 37 will unwind, and as the drum 1 is rotated in the other direction, the hose 37 will wind around the drum 1. This arrangement has proved most convenient in shop practice, as it keeps the hose 37 off the floor and out of the way of the workman.

For the purpose of full disclosure of my invention I have described in some detail a specific embodiment thereof; but it will be apparent that numerous changes might be made in the physical embodiment of my invention within the scope of the claims, and I do not desire, therefore, to be understood as limiting myself, in the broader aspect of my invention, to the specific construction shown and described.

Having described my invention, what I regard as new, and desire to secure by Letters Patent of the United States, is:

1. A machine for developing or generating intersections of cylinders, comprising a cutting device, means to cause said cutting device to describe a circle, and automatically variable means to cause said cutting device to generate a curve while describing such circle.

2. A machine for developing or generating intersections of cylinders, comprising an adjustable cutting device, adjustable means to cause said cutting device to describe a circle, and automatically variable adjustable means to cause said cutting device to generate a curve while describing such circle.

3. A machine for developing or generating intersections of cylinders, comprising a cutting device, means to cause said cutting device to describe a circle, automatically variable means to cause said cutting device to generate a curve while describing such circle, and means to adjust said second means to vary the angle of the developed intersection.

4. A machine for developing or generating intersections of cylinders, comprising an adjustable cutting device, adjustable means to cause said cutting device to describe a circle, automatically variable adjustable means to cause said cutting device to generate a curve while describing such circle, means to adjust said second means to vary the angle of the developed intersection, and means to reverse said last named means.

5. A machine for developing or generating intersections of cylinders, comprising a cutting device, means to cause said cutting device to describe a circle, automatically variable means to cause said cutting device to generate a curve while describing such circle, means to adjust said second means to vary the angle of the developed intersection, and means to reverse said last named means.

6. A machine for developing or generating intersections of cylinders, comprising a drum, a longitudinally slidable rod carried by said drum, means to adjust the position of said rod with relation to the axis of said drum, a pipe-cutting mechanism carried by one end of said rod, a universal joint on the other end of said rod, an oscillating U-shaped member, said universal joint being mounted and laterally slidable thereon, and means to adjust the radius of the arc through which said U-shaped member oscillates.

7. A machine for developing or generating intersections of cylinders, comprising a drum, a longitudinally slidable rod carried by said drum, means to adjust the position of said rod with relation to the axis of said drum, a pipe-cutting mechanism carried by one end of said rod, a universal joint on the other end of said rod, an oscillating U-shaped member, said universal joint being mounted and laterally slidable thereon, a base adjacent one end of said drum, standards secured to said base, journals on said standards on which said U-shaped member oscillates, and means to adjust the radius of the arc through which said U-shaped member oscillates.

8. A machine for developing or generating intersections of cylinders, comprising a drum, a longitudinally slidable rod carried by said drum, means to adjust the position of said rod with relation to the axis of said drum, a pipe-cutting mechanism carried by one end of said rod, a universal joint on the other end of said rod, an oscillating U-shaped member, said universal joint being mounted and laterally slidable thereon, a base adjacent one end of said drum, said base being axially rotatable, standards secured to said base, journals in said standards on which said U-shaped member oscillates, and means to adjust the radius of the arc through which said U-shaped member oscillates.

9. In a machine for developing or generating intersections of cylinders, a drum, means to rotate said drum, a pair of guides at each end of said drum, carriages mounted on said guides, a rod slidably mounted in said carriages, and means to adjust the position of said carriages with relation to the axis of said drum.

10. A machine for developing or generating intersections of cylinders, comprising a drum, a longitudinally slidable rod carried by said drum, means to adjust the position of said rod with relation to the axis of said drum, an oxyacetylene torch carried by one end of said rod, a universal joint on the other end of said rod, an oscillating U-shaped member, said universal joint being mounted and laterally slidable thereon, and means to adjust the radius of the arc through which said U-shaped member oscillates.

11. A machine for developing or generating intersections of cylinders, comprising a drum, a longitudinally slidable rod carried by said drum, means to adjust the position of said rod with relation to the axis of said drum, an oxyacetylene torch carried by one end of said rod, a universal joint on the other end of said rod, means to adjust the position of said torch with relation to the axis of said drum, an oscillating U-shaped member, said universal joint being mounted and laterally slidable thereon, and means to adjust the radius of the arc through which said U-shaped member oscillates.

12. A machine for developing or generating intersections of cylinders, comprising a drum, a longitudinally slidable rod carried by said drum, means to adjust the position of said rod with relation to the axis of said drum, an oxyacetylene torch carried by one end of said rod, a universal joint on the other end of said rod, an oscillating U-shaped member, said universal joint being mounted and laterally slidable thereon, means to adjust the radius of the arc through which said U-shaped member oscillates, flexible means to convey gas to said torch, said flexible means being wrapped around said drum, and a counterweight to support said flexible means after it leaves said drum.

FRED C. FANTZ.